United States Patent

Jarick

[11] Patent Number: 5,237,419
[45] Date of Patent: Aug. 17, 1993

[54] TELEVISION SIGNAL REPEATER WITH IMPROVED AURAL SEPARATION

[75] Inventor: James M. Jarick, White Haven, Pa.

[73] Assignee: Electronic Missiles & Communications, Inc. (EMCEE), White Haven, Pa.

[21] Appl. No.: 665,599

[22] Filed: Mar. 6, 1991

[51] Int. Cl.$^5$ .............................................. H04N 5/62
[52] U.S. Cl. ..................................... 358/186; 358/198; 358/149; 455/17; 455/20
[58] Field of Search ..................... 455/17, 20; 358/186, 358/197, 198, 149

[56] References Cited

U.S. PATENT DOCUMENTS

| | | | |
|---|---|---|---|
| 2,671,850 | 3/1954 | Marcou | 455/17 |
| 3,259,689 | 7/1966 | Sienkiewicz | 455/20 |
| 3,283,249 | 11/1966 | Mitchell | 455/17 |
| 3,308,379 | 3/1967 | Leysieffer et al. | 455/20 |
| 3,619,782 | 11/1971 | Stokes | 455/20 |
| 3,860,870 | 1/1975 | Furuya | 455/17 |
| 4,198,600 | 4/1980 | Oguchi et al. | 455/17 |
| 4,414,686 | 11/1983 | Lenz | 455/20 |
| 4,434,440 | 2/1984 | Schiff | 358/186 |
| 4,490,743 | 12/1984 | Mycynek et al. | 358/197 |
| 4,533,936 | 8/1985 | Tiemann et al. | 358/12 |
| 4,535,361 | 8/1985 | Corbel | 358/186 |
| 4,591,915 | 5/1986 | Daridov et al. | 358/198 |
| 4,783,843 | 11/1988 | Leff et al. | 455/20 |
| 4,888,641 | 12/1989 | Isnardi et al. | 358/12 |
| 4,933,767 | 6/1990 | Hyakutake | 358/198 |

Primary Examiner—James J. Groody
Assistant Examiner—Jeffrey S. Murrell
Attorney, Agent, or Firm—Kane, Dalsimer, Sullivan, Kurucz, Levy, Eisele and Richard

[57] ABSTRACT

An RF repeater for receiving and retransmitting video composite signals, especially wherein the signals of different channels are spectrally adjacent includes discrete aural and visual stages for separating the composite video signal into its components. The aural stage includes a phased locked loop filter while the visual stage may use a SAW filter. After separation and amplification, the two signals are up-converted and combined for retransmission. The visual stage also includes a phase locked loop for synthesizing a local oscillator signal and for phase lock detection.

4 Claims, 7 Drawing Sheets

TELEVISION SIGNAL REPEATER WITH IMPROVED AURAL SEPARATION

BACKGROUND OF THE INVENTION a. Field of Invention

This invention pertains to a repeater for television signals, and more particularly to a repeater in which a composite received television signal is separated into a visual component and an aural component, each component is amplified and then the amplified signals are recombined into a composite signal for retransmission.

b. Description of the Prior Art

Due to the large demand for RF signal channels, especially in the range of cable television signals, the spacing between adjacent channels has been reduced considerably. With the advent of the multichannel multi-point distribution service (MMDS) this spacing has shrunk to a point that television signal channels are virtually adjacent. One of the problems associated with this type of transmission is that spurious out-of-band by products are generated in repeater stations which degrade the composite video signals. It was found that to overcome this problem, repeaters has to separate each composite signal into an aural and a visual component and process them separately. One method of performing this separation was to use a brute force filtering approach. This approach consisted of using a relatively wide (about 5 Mhz) vestigial side band SAW filter to pass the visual carrier while attenuating the aural signal. A very narrow L-C filter stage was used to pass the aural signal. However the narrow filter stage created amplitude and frequency variations in the aural signal which degrades the signal and stereo signal separation.

OBJECTIVES AND SUMMARY OF THE INVENTION

In view of the above-mentioned disadvantages of the prior art, it is an objective of this invention to provide a repeater for composite video signals wherein the composite video signals are accurately amplified and/or frequency shifted by separating the aural and visual signals.

A further objective is to provide a repeater which may be made economically with off the shelf components.

Other objectives and advantages shall become apparent from the following description of the invention. Briefly, and RF repeater constructed in accordance with this invention consists of an IF converter stage for converting an incoming RF signal to a composite IF signal consisting of an aural and a visual component, a visual IF stage for separating out and amplifying the visual component, and an aural IF stage for separating out and amplifying the aural component. Advantageously, the aural IF stage includes a phase locked loop for filtering the aural component while rejecting the visual component. The two amplified IF signals are then fed to an up-converter for conversion to an RF channel. An additional phase-locked loop is used in the video to generate the local oscillator signal.

DETAILED DESCRIPTION OF THE INVENTION

Figure 1:
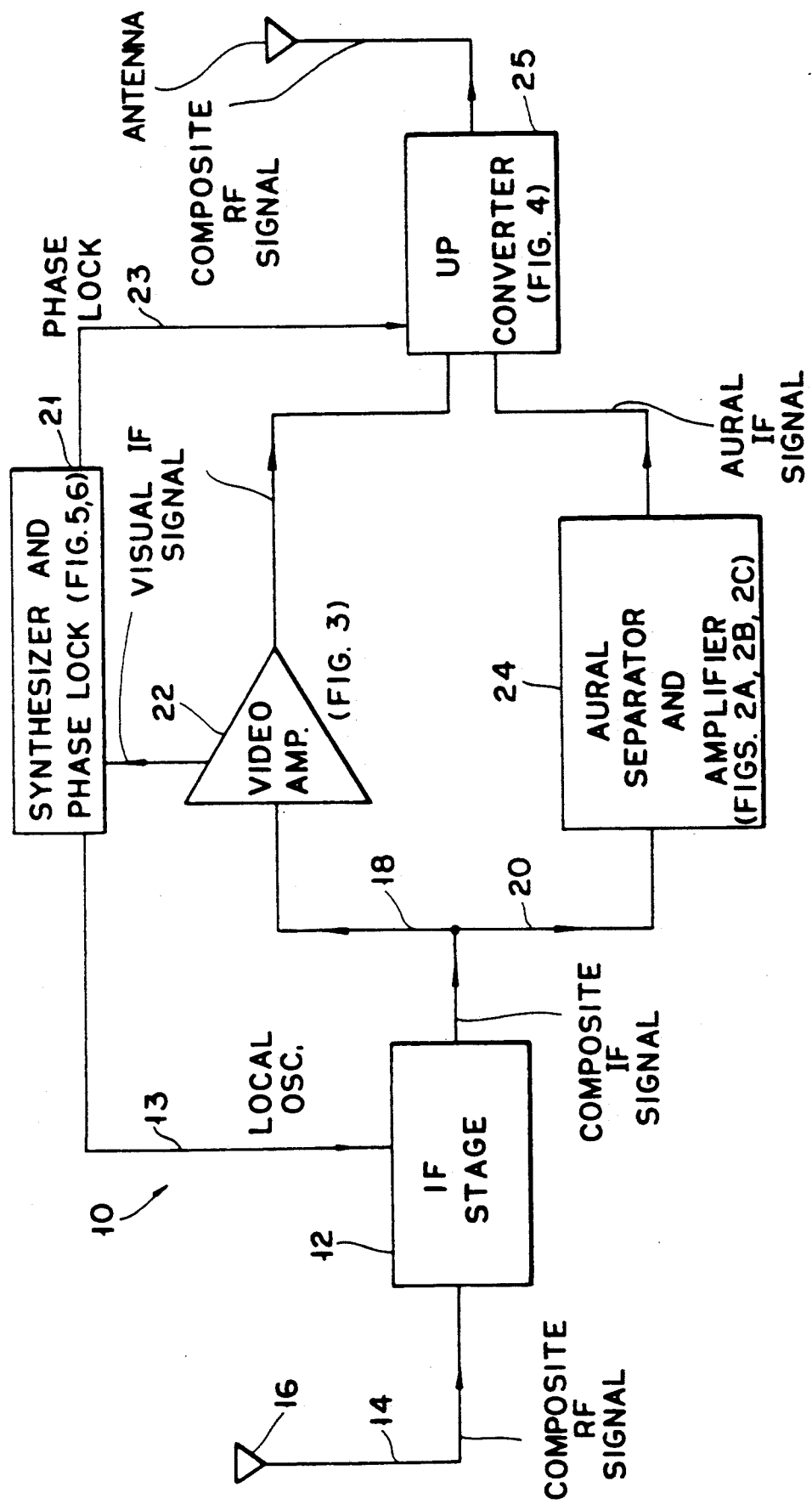
FIG. 1 shows a block diagram for a repeater constructed in accordance with this invention.

Referring now to the FIGS., a repeater 10 constructed in accordance with this invention includes an IF stage 12 which receives an RF composite video signal on an input line 14 connected for example to an antenna 16. IF stage 12 filters and converts this composite video signal to a composite video signal at an IF frequency by mixing with a local oscillator signal (L0) on line 13. This IF composite video signal is fed equally on lines 18 and 20 to a visual amplifier stage 22 and an aural separator and amplifier stage 24. This composite video signal may consist of a video signal at 45.75 MHz and an aural signal at 41.25 MHz. The IF outputs of these stages are combined and converted to an RF channel by an up-converter stage 25.

The visual IF signal is also sampled by a synthesizer and phase lock circuit 21. This circuit uses the sampled circuit to generate the local oscillator signal on line 13. The circuit also generates a signal on line 23 for up converter 25. The up converter 25 transmits signals only if the local oscillator is in phase with the incoming visual IF signal.

Figure 2A:
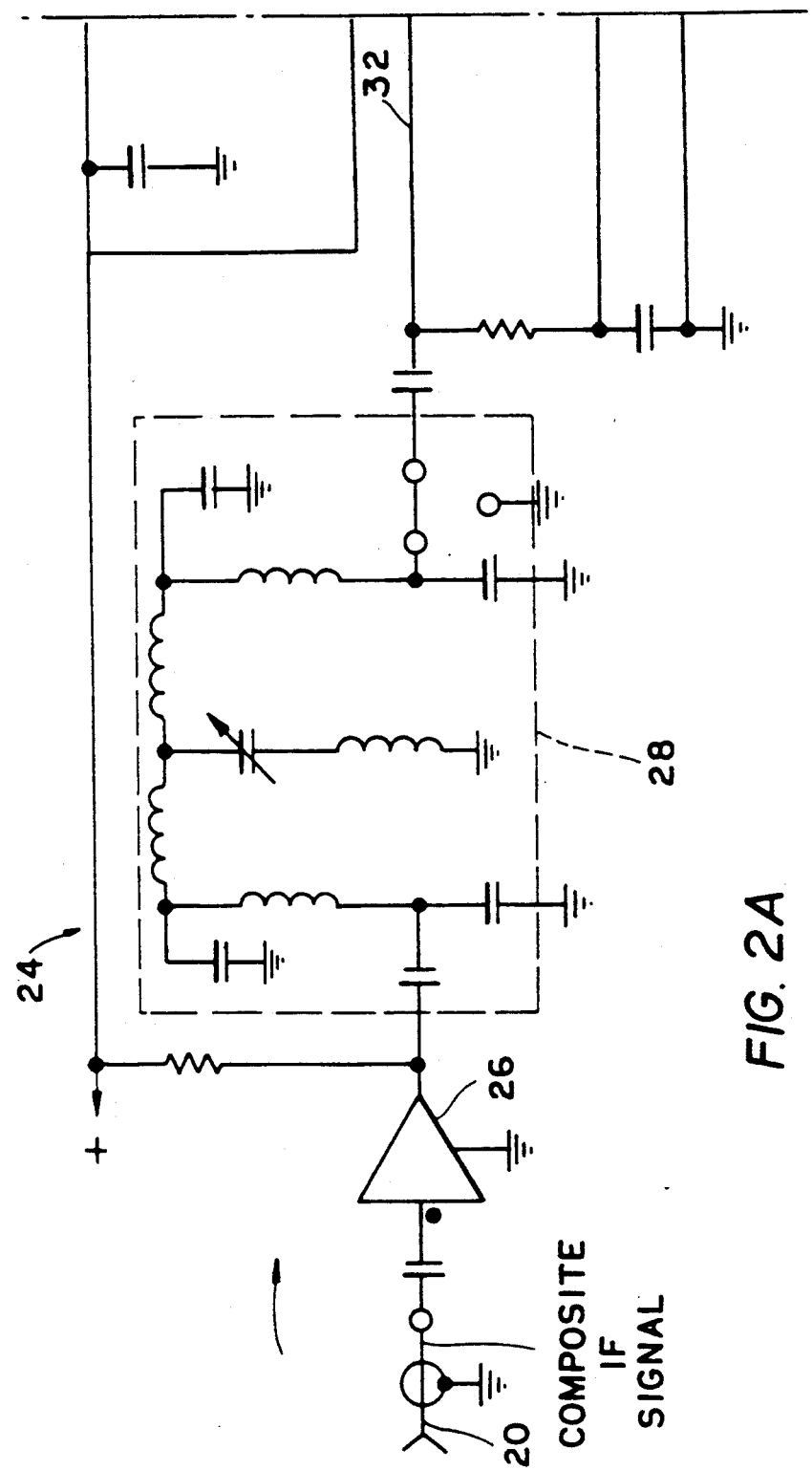
FIGS. 2A and 2B show details of the aural separator and amplifier shown in FIG. 1.

As shown in FIG. 2A, the aural separator and amplifier stage 24 includes an input operational amplifier 26 which receives the composite IF video signals on line 20. The output of amplifier 26 is fed to a low pass L-C filter 28 which attenuates the visual signal carrier by about 20 dB without substantially affecting the aural signals. The output of filter 28 is fed to an IC 30 on line 32.

IC 30 is preferably an FM IF amplifier circuit such as a CA 3089 available from RCA. Normally, this circuit is used at about 10 MHz in an FM broadcast receiver IF section as a quadrature detector to demodulate the FM signal and amplify the audio signal. As shown in a diagrammatic form in FIG. 2C, in an FM receiver, the FM signal received at pin 1 is amplified by amplifier 31 and fed to a quadrature detector 33. The quadrature detector also receives an input from pin 9 from an outside quadrature signal generator 35. The detector compares the quadrature signal to the amplified FM signal and generates two outputs. One output is amplified by amplifier 37 and is outputted on pin 7 as an AFC control signal. The second output is amplified by another amplifier 39 and results in the audio signal at pin 6. However, in the present invention, the same integrated circuit is used at a frequency of about 45 MHz as a phase detector as follows.

A transistor 34, variable capacitor 36, varactor 39, and a transformer 38 are interconnected to form a voltage controlled oscillator and generate a VCO output on line 42.

Figure 2B:
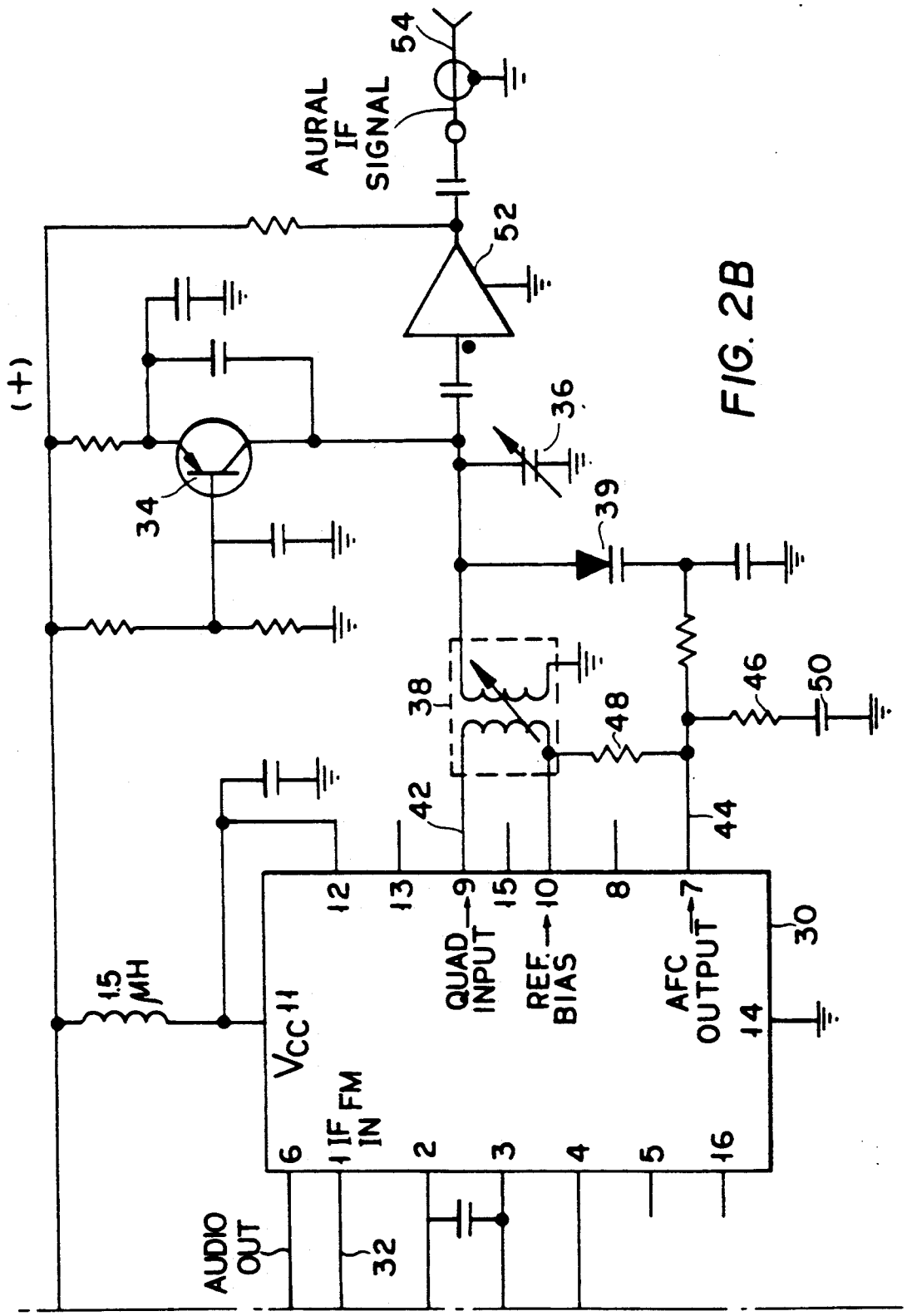
Figure 2C:
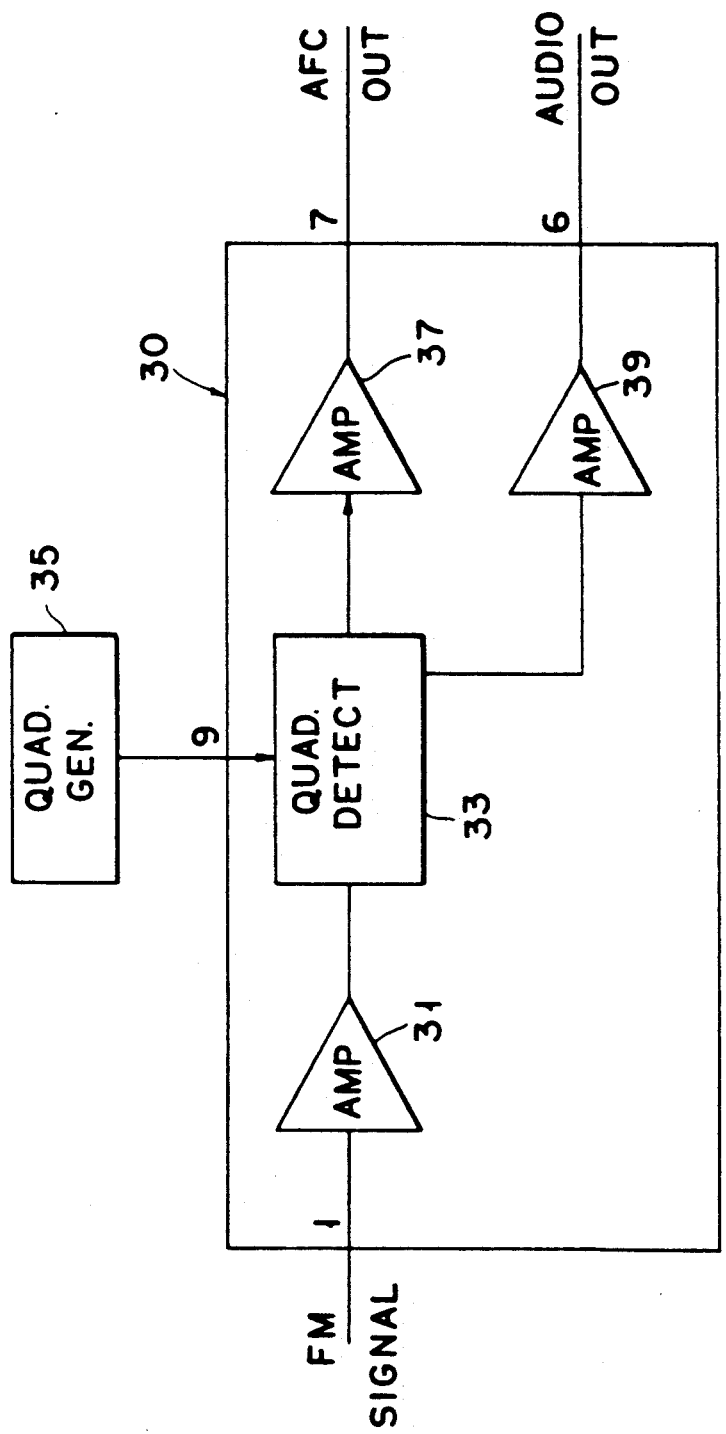
FIG. 2C shows details of the quadrature detector of FIG. 2B.

As shown in FIG. 2B, the output from the L-C filter is fed to pin 1 on IC 30 on line 1. In standard operations, this pin receives the IF FM signal. However, the quadrature amplitude detector of the IC 30 in this case is used as a phase detector to compare the filtered IF signal at pin 1 to the VCO signal received on pin 9 from line 42. IC 30 then generates a DC control voltage on output pin 7 which is used to control the operation of varactor 36 and transistor 34 through line 44. Initially, this DC control signal sets the center frequency of the VCO. As the IF signal on pin 1 changes, the output on pin 7 of IC 30 also changes to track the aural signal superposed on the aural carrier signal. This aural signal is used to change the VCO to deviate from its center frequency at the same rate and amplitude as the aural carrier. The loop bandwidth of the VCO is determined by resistors 46 and 48 and capacitor 50, locking its frequency to the frequency of the aural carrier and rejecting the visual carrier.

In this manner IC 30 and the VCO form a phase locked loop tracking filter to duplicate the IF aural component while rejecting the visual component of the composite IF signal.

The aural signal thus generated is fed to an amplifier 52 and output on line 54.

Figure 3:
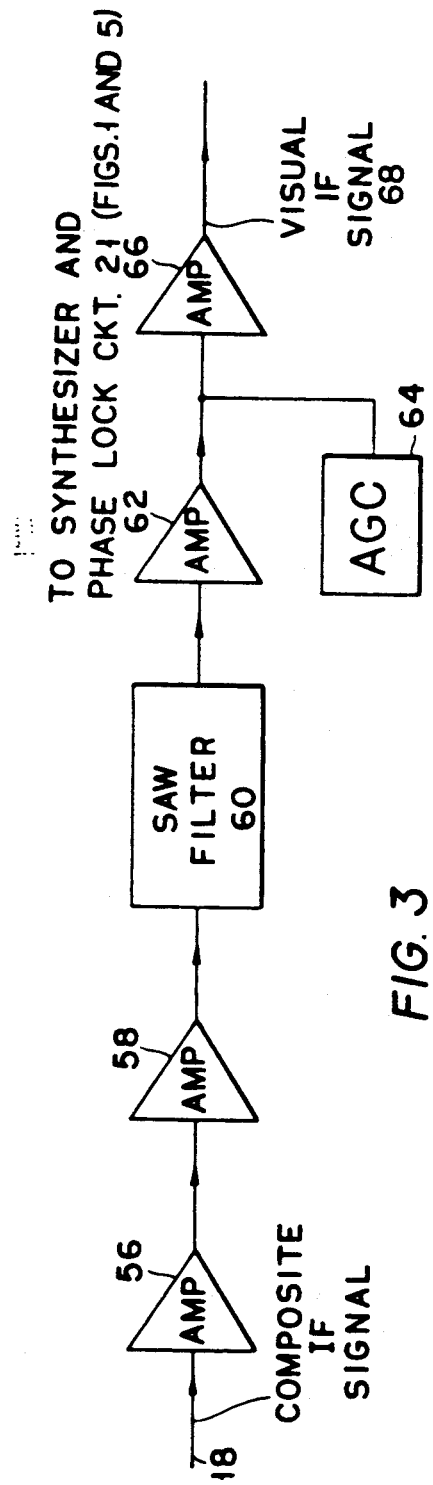
FIG. 3 shows details of the visual amplifying stage shown in FIG. 1.

As previously mentioned, the composite IF signal is also fed on line 18 to a visual amplifier stage 22. Details of this stage 22 are shown in FIG. 3. The composite IF signal is fed to two cascaded amplifiers 56, 58. The amplified signal is then fed to a SAW filter 60 which passes the visual component of the composite signal and attenuates the audio component by about 30–40 dB. The output of filter 60 is amplified by amplifier 62. The output of amplifier 62 is again amplified by amplifier 66 and output on line 68. The gain of amplifier 66 is controlled by a gain control circuit (AGC) 64. The output of amplifier 62 is also sampled by the synthesizer and phase lock circuit 21 as described below.

Figure 4:
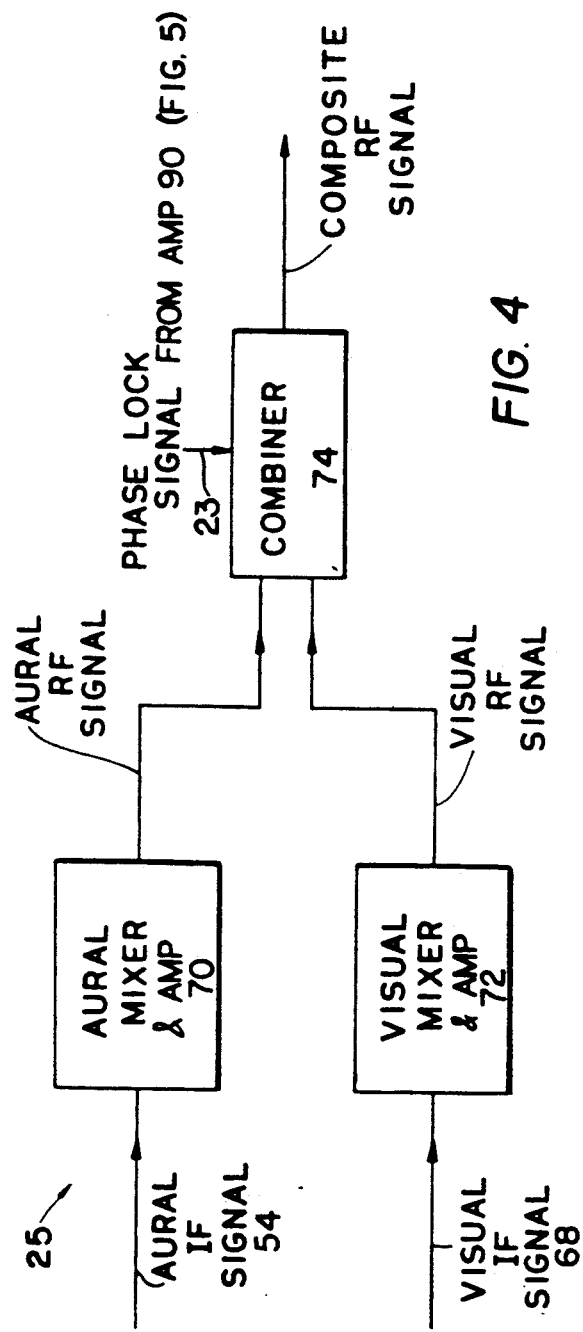
FIG. 4 shows details of the up converter shown in FIG. 1.

The aural and visual IF signals thus separated and amplified are combined and converted to an RF frequency by up-converter stage 25. As shown in FIG. 4, the up-converter stage 25 includes an aural mixer and amplifier stage 70 and a visual mixer and amplifier stage 72. Each of these stages receives an input on lines 54 and 68 respectively for converting the aural IF and visual IF signals to an RF channel. The resulting aural RF signals and visual RF signals are fed to a combiner 74 which combines these two signals to obtain a composite RF signal. Combiner 74 may be constructed in a number of ways depending for example on the desired power level of the composite output RF signal. For relative low power signals, for example, in the range of 1–10 watts, combiner 74 may be a coil-type coupler. For a higher power level, a cavity filter type diplexer may be used such as one made by the Microwave Communications Corporations, Inc., under the name of MDS/ITFS diplexer. Other diplexers using stripline and microstrip combining techniques may also be used.

Figure 5:
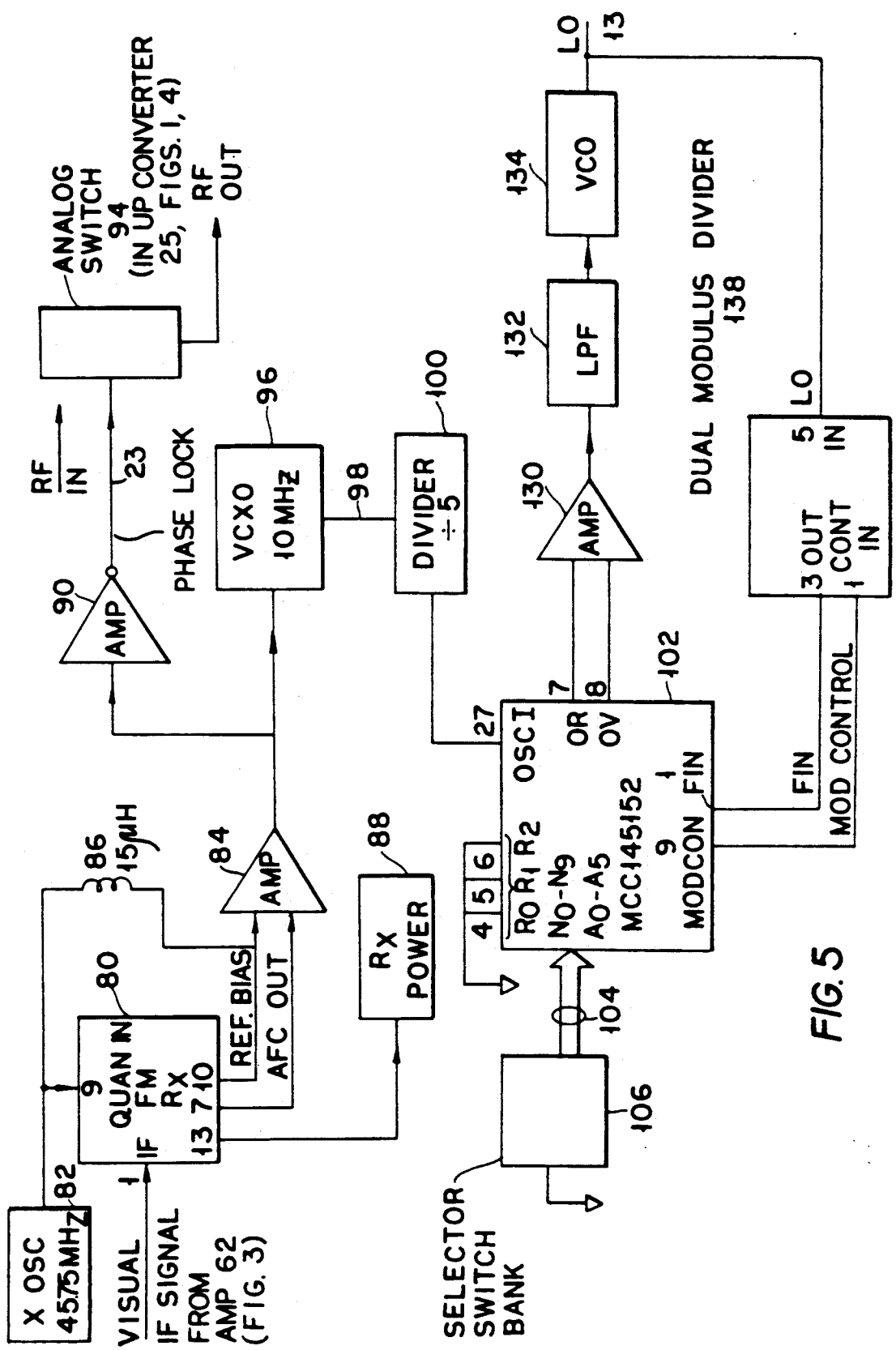
FIG. 5 shows details of the frequency synthesizer and phase lock loop circuitry.

The circuit 21 consists of two section: a phase/detector/limiter section and a synthesizer section as shown in FIG. 5. The first section includes an IF FM amplifier circuit 80 preferably identical to IC 30 described above. Circuit 80 samples at its IF IN input 1 the visual IF signal from amplifier 62 (FIG. 3). The quadrature input 9 of the receiver is connected to the output of a temperature compensated crystal oscillator 82 operating at 45.75 MHz. The circuit 80 compares these two signals and outputs the difference on two output pins 10, 7 normally used for the RF BIAS and the AFC output signals respectively. These two output signals are fed to an operational amplifier stage 84. The output signal on pin 10 is also coupled to the input pin 9 through an inductor 86. Thus, the circuit 80, oscillator 82 and inductor 86 form a phase-locked loop filter. The output of amplifier stage 84 indicates when the two inputs to the FM receiver IC are in phase. Circuit 80 also has a TUNE METER output on pin 13. This output is fed to a meter 88 used to indicate the power of the received IF visual signals.

The output of amplifier stage 84 is used to drive an amplifier stage 90. This stage 90 generates an output on line 23 when the output of amplifier stage 84 indicates a phase lock. Line 23 is used to control an analog switch 94. This switch may be disposed in the up-converter 25 to control the RF output. The switch is closed allowing RF signals to be output only when amplifier 84 detects a phase lock condition. When the phase locked condition is lost, switch 94 opens shutting down the output of the repeater 10.

Finally, the output of amplifier 84 is also used to control a 10 MHz voltage controlled crystal oscillator 96. This oscillator 96 generates an output on line 98 only if there is a phase-locked loop condition. The output of the 10 MHz is fed to the synthesizer section of circuit 21 including a frequency divider 100. Divider 100 divides the signal on line 98 by 5. The synthesizer section also includes VHF synthesizer IC chip 102 which may be, for example, an MCC 145152 P2 made by Motorola. IC 102 is used to generate and maintain local a oscillator signal L0 as follows. IC 102 receives the output of divider 100 on its OSCI pin 27. IC 102 also has three sets of inputs to define three divisors A, N and R. In the present invention, R is chosen to be 12 grounding inputs R0, R1, R2. Divisors N and A are settable from a bank of selector switches schematically identified as 106. It should be understood that at least some of these switches may be accessible externally without dismantling the unit. The switches from bank 106 are coupled to IC chip 102 by a parallel bus 104.

Figure 6:
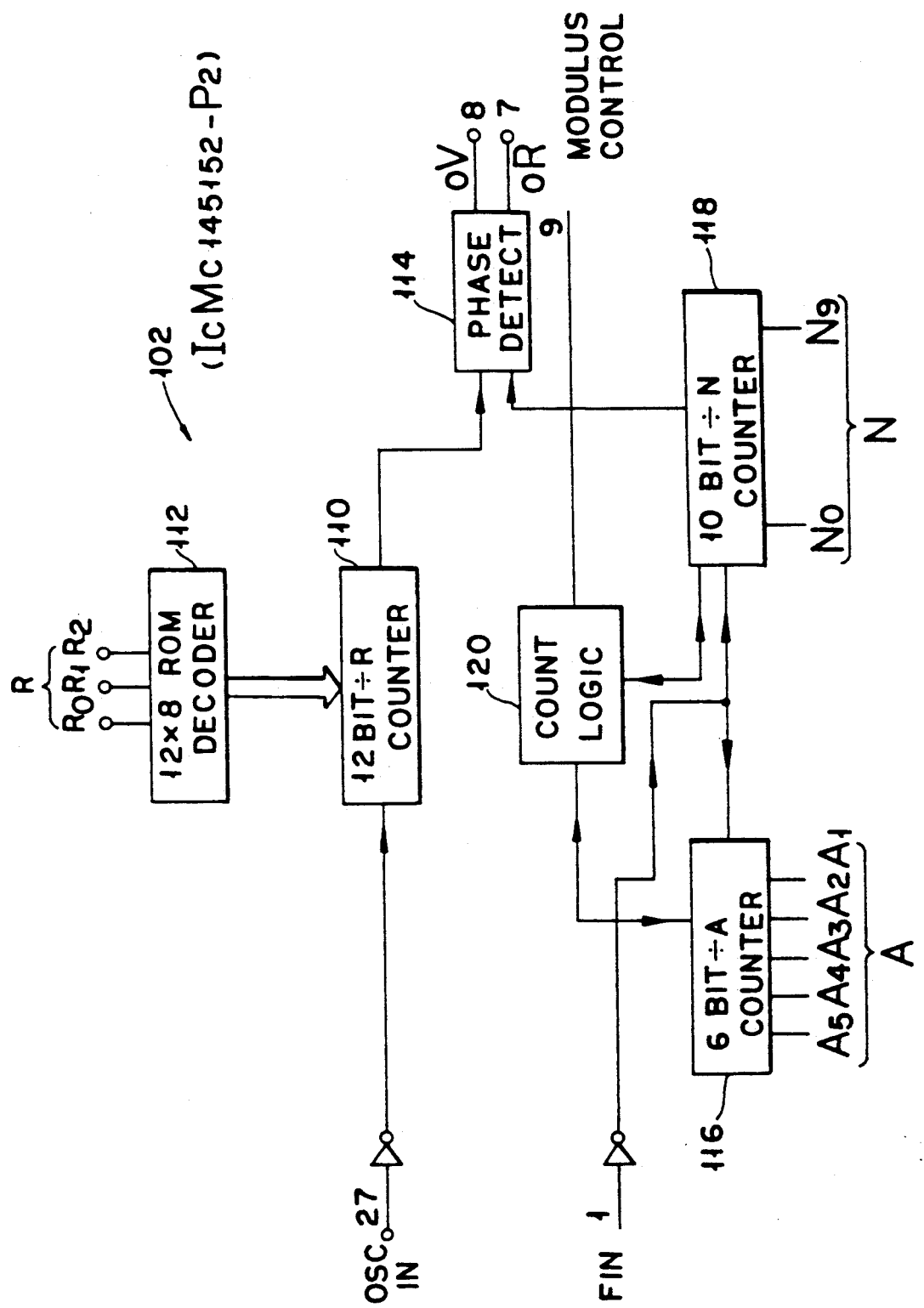
FIG. 6 shows details of a VHF synthesizer IC chip used in the circuitry of FIG. 5.

Details of IC chip 102 are shown in FIG. 6. The 2MHz signal received at input in 27 is divided by a 12-bit divide by R counter 110. R is selected by setting inputs R0–R2 to select a value from a look table or ROM 112. As previously mentioned, in this invention R is set to 12. The counter 110 therefore generates a 250 Khz signal which is input to a phase detector 114. The chip also includes a divide-by-A counter 116 and a divide-by-N counter 118. The two counters are coupled through a control logic circuit 120. The output of counter 118 is also coupled to an input of phase detector 114. The numbers N and A can be selected such that the phase detector generates on its output lines OV and OR a signal having a frequency corresponding to the frequency of the VHF composite video signal to be transmitted by the repeater.

Referring back to FIG. 5, the output of IC 102 on pins 7, 8 are fed to an amplifier 130 for amplification and than to a low pass filter 132. The output of filter 132 is fed to a voltage controlled oscillator (VCO) 134. VCO 134 in response to the signal from the filter 1432 generates the local oscillator signal L0 which is fed on line 13 to the IF stage 12. This stage 12 then mixes the incoming composite RF signal with this L0 signal and, after filtering generates the composite IF signal as described.

To complete the phase-locked loop synthesizer, the L0 signal is also fed back to a dual modulus divider 138 as shown in FIG. 5. This divider 138 divides the L0 signal by either 20 or 21, dependent on the signal on the MOD CONTROL line from IC chip 102. The MOD CONTROL signal is generated by the control circuit 120. More particularly, the MOD CONTROL signal is low at the beginning of each count cycle causing the divider 138 to divider the signal L0 by 21. The MOD CONTROL signal goes high when the counter 116 reaches zero and, remains high until counter 118 also reaches zero. During this time divider 138 divides L0 by 20. Thereafter, the counters are reset and the cycle is started over again.

Obviously numerous modifications could be made to this invention without departing from its scope as defined in the appended claims.

We claim:

1. A repeater for receiving and retransmitting a composite video signal at an RF frequency comprising:
   a. receiver means for receiving an input RF video signal;
   b. IF stage means for converting said input RF composite signal into an input IF composite signal;
   c. visual stage means for separating a visual IF component from said input IF composite signal;
   d. aural stage means for separating an aural IF component from said input IF composite signal, said aural stage means including aural phase-locked filter means;
   e. converting means for converting said aural and visual IF signals into aural and visual output RF signals respectively;
   f. combining means for combining said aural and visual output RF signals into an output RF composite signal for retransmission; and
   g. signal processing means including frequency synthesizer means coupled to said visual stage means for generating a local oscillator signal for said IF stage means.

2. The repeater of claim 1 wherein said signal processing means includes oscillator means and visual phase lock loop means for synchronizing the output of said oscillator means to said visual IF component.

3. The repeater of claim 2 wherein said oscillator means includes a crystal oscillator, and wherein said visual phase lock loop means includes a quadrature input coupled to said crystal oscillator, and an FM signal input for receiving said visual IF component.

4. The repeater of claim 2 wherein said signal processing means includes a phase detector means for detecting when said local oscillator signal is phase locked to said visual IF component, said repeater including analog switch means for controlling the output of said combining means, and switch control means coupled to said phase detector means for operating said analog switch means.

* * * * *